United States Patent
Endo et al.

(10) Patent No.: US 10,057,384 B2
(45) Date of Patent: Aug. 21, 2018

(54) SIGNAL CONVERSION SYSTEM AND SIGNAL CONVERSION METHOD

(71) Applicants: Satoshi Endo, Tokyo (JP); Yoshiaki Koizumi, Tokyo (JP); Masahiro Ishihara, Tokyo (JP)

(72) Inventors: Satoshi Endo, Tokyo (JP); Yoshiaki Koizumi, Tokyo (JP); Masahiro Ishihara, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 142 days.

(21) Appl. No.: 14/759,685

(22) PCT Filed: Jan. 11, 2013

(86) PCT No.: PCT/JP2013/050455
§ 371 (c)(1),
(2) Date: Jul. 8, 2015

(87) PCT Pub. No.: WO2014/109056
PCT Pub. Date: Jul. 17, 2014

(65) Prior Publication Data
US 2015/0358432 A1    Dec. 10, 2015

(51) Int. Cl.
*H04J 3/16* (2006.01)
*H04L 29/06* (2006.01)

(52) U.S. Cl.
CPC .................. *H04L 69/08* (2013.01)

(58) Field of Classification Search
None
See application file for complete search history.

(56) References Cited

U.S. PATENT DOCUMENTS

| 2004/0139210 A1* | 7/2004 | Lee | H04L 29/06 709/230 |
| 2005/0210177 A1* | 9/2005 | Norden | G06F 13/4022 710/317 |

(Continued)

FOREIGN PATENT DOCUMENTS

| JP | H08-123745 A | 5/1996 |
| JP | H09-200203 A | 7/1997 |

(Continued)

OTHER PUBLICATIONS

International Search Report of the International Searching Authority dated Feb. 26, 2013 for the corresponding international application No. PCT/JP2013/050455 (and English translation).

*Primary Examiner* — Alex Skripnikov
*Assistant Examiner* — Lionel Preval
(74) *Attorney, Agent, or Firm* — Posz Law Group, PLC

(57) ABSTRACT

A signal conversion system comprises measuring units, a switcher, a converter, and a host. The converter mutually converts signals transmitted in compliance with a first protocol for communicating with a pre-specified party and signals transmitted in compliance with a second protocol different from the first protocol. The host specifies a given measuring unit among the measuring units communicating in compliance with the first protocol. Then, the switcher switches the transmission channel of signals transmitted in compliance with the first protocol to the transmission channel connecting the measuring unit specified by the host and the converter.

7 Claims, 19 Drawing Sheets

(56) References Cited

U.S. PATENT DOCUMENTS

| | | | |
|---|---|---|---|
| 2008/0304515 A1* | 12/2008 | Maeda | H04L 69/16 370/466 |
| 2010/0312930 A1* | 12/2010 | Yamagata | G06F 13/4045 710/67 |
| 2011/0091212 A1 | 4/2011 | Nonaka | |
| 2012/0011233 A1* | 1/2012 | Dixon | H04L 65/1073 709/221 |
| 2015/0082385 A1* | 3/2015 | Maria | H04W 24/10 726/3 |

FOREIGN PATENT DOCUMENTS

| | | |
|---|---|---|
| JP | H09-321819 A | 12/1997 |
| JP | 2000-078228 A | 3/2000 |
| JP | 2000-138726 A | 5/2000 |
| WO | 2009/130817 A1 | 10/2009 |

* cited by examiner

SIGNAL CONVERSION SYSTEM AND SIGNAL CONVERSION METHOD

CROSS REFERENCE TO RELATED APPLICATION

This application is a U.S. national stage application of PCT/JP2013/050455 filed on Jan. 11, 2013, the contents of which are incorporated herein by reference.

TECHNICAL FIELD

The present disclosure relates to a signal conversion system and signal conversion method.

BACKGROUND ART

Recently, as a result of rapid advancements in communication techniques, electric, radio, optical, and other signals are transmitted in compliance with various communication protocols (communication rules). In transmitting those signals, a conversion adapter for converting signals transmitted in compliance with one communication protocol to signals transmitted in compliance with another communication protocol may be used (for example, see Patent Literature 1). Patent Literature 1 describes, as such a conversion adapter, a packet node connecting a communication network to another communication network.

CITATION LIST

Patent Literature

Patent Literature 1: International Publication No. WO 2009/130817.

SUMMARY OF INVENTION

Technical Problem

Generally, multiple devices are connected to a communication network. Therefore, on a communication network, signals containing information for specifying a party to communicate with are transmitted in compliance with a given protocol.

On the other hand, for example, in the case of two devices connected via a single signal line communicating with each other, there is no need to specify a party to communicate with. In such a case, signals containing no information for specifying a party to communicate with may be transmitted in compliance with a given protocol (hereafter referred to as a one-on-one communication protocol).

Therefore, for connecting multiple devices communicating in compliance with a one-on-one communication protocol to a communication network or the like, a conversion adapter is required for each device in order to specify each device. Consequently, installation of conversion adapters is an intricate task and a prolonged preparation period may be required before starting the communication.

The present disclosure is made in view of the above circumstance and an objective of the present disclosure is to shorten the preparation period required before starting the communication.

Solution to Problem

In order to achieve the above objective, the signal conversion system of the present disclosure comprises:

conversion means for converting signals transmitted in compliance with a first protocol for communicating with a pre-specified party to signals transmitted in compliance with a second protocol different from the first protocol and conversing signals transmitted in compliance with the second protocol to signals transmitted in compliance with the first protocol;

specification means for specifying one second communication terminal among multiple second communication terminals transmitting or receiving signals in compliance with the first protocol to communicate with a first communication terminal via the conversion means; and switching means for switching the transmission channel on which signals are transmitted between any of the multiple second communication terminals and the conversion means to the transmission channel connecting the second communication terminal specified by the specification means and the conversion means.

Advantageous Effects of Invention

According to the present disclosure, the switching means can switch the transmission channel connecting a first communication device and the conversion means. Therefore, there is no need to install the conversion means for each of the first communication devices. Thus, the preparation period required before starting the communication can be shortened.

DESCRIPTION OF EMBODIMENTS

Embodiments of the present disclosure will be described in detail hereafter with reference to the drawings.

Embodiment 1

Figure 1:
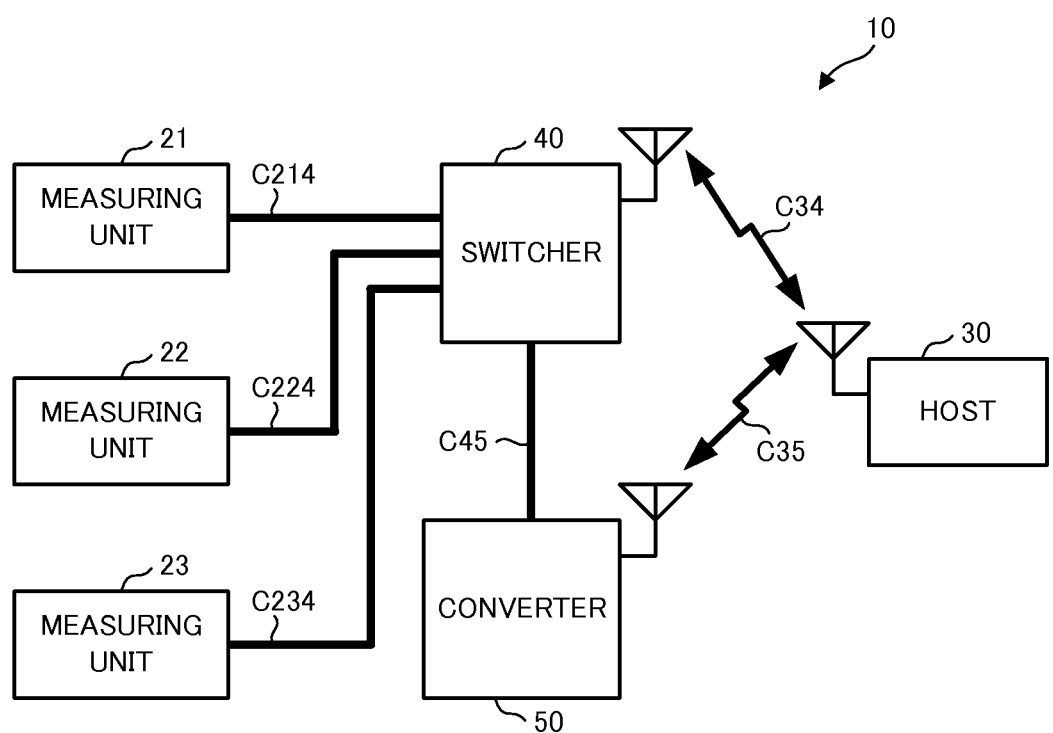
FIG. 1 is a block diagram showing the configuration of the signal conversion system according to Embodiment 1.

FIG. 1 shows the configuration of a signal conversion system 10 according to this embodiment. The signal conversion system 10 is a system for measuring units 21, 22, and 23 and a host 30 to communicate with each other. The communication is conducted using a first protocol and a second protocol.

The first protocol is a communication protocol for communicating with a pre-specified party. The first protocol is used, for example, for communication between devices connected via a single cable (transmission channel). In FIG. 1, the transmission channels C214, C224, C234, and C45 of signals transmitted in compliance with the first protocol are shown by thick lines.

The first protocol according to this embodiment includes so-called physical layer or link layer communication protocols for establishing communication using electric, optical, or electromagnetic waves to so-called application layer communication protocols for establishing communication between software components. In other words, two devices communicating by the first protocol mutually transmit/receive signals not containing information for specifying the device of the other party in communication and conduct one-on-one communication without specifying the other party.

Figure 2:
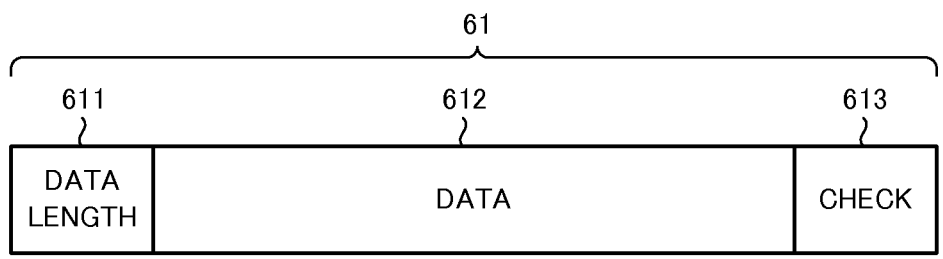
FIG. 2 is a chart showing the structure of a frame transmitted in compliance with the first protocol.

As shown in FIG. 2, a frame 61 transmitted in the data link layer of the first protocol comprises a data length 611, data 612, and a check 613. The data length 611 is information presenting the size of the data 612 by the number of bytes. The data 612 are information presenting the communication contents. The check 613 is information for checking whether there is any bit error and the like in the data 612. As shown in FIG. 2, the frame 61 does not contain information for identifying the destination to which the frame 61 is delivered.

On the other hand, the second protocol is a communication protocol for specifying and communicating with a party on a network to which multiple devices are connected. In FIG. 1, the transmission channels C34 and C35 of wireless signals transmitted in compliance with the second protocol are shown by arrows.

Figure 3:
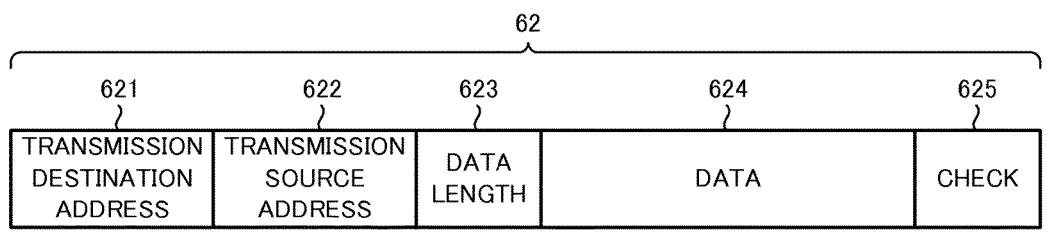
FIG. 3 is a chart showing the structure of a frame transmitted in compliance with the second protocol.

As shown in FIG. 3, a frame 62 transmitted in the data link layer of the second protocol comprises a transmission destination address 621, a transmission source address 622, a data length 623, data 624, and a check 625. The transmission destination address 621 is information for identifying the destination to which the frame 62 is delivered. The transmission source address 622 is information for identifying the device having transmitted the frame 62.

Furthermore, the data length 623 is information presenting the size of the data 624. The data 624 are information presenting the communication contents. The check 625 is information for checking whether there is any bit error and the like in the data 624.

The signal conversion system 10 has, as shown in FIG. 1, measuring units 21 to 23, a host 30, a switcher 40, and a converter 50.

The measuring units 21 to 23 are installed separately, for example, at receptacle outlets in a residence. The measuring units 21 to 23 measure the electric power supplied to a home electric appliance from the receptacle outlet. Furthermore, the measuring units 21 to 23 are connected to the switcher 40 via the transmission channels C214, C224, and C234, respectively. Then, the measuring units 21 to 23 each transmit a response frame containing measurement results only when a request frame for requesting measurement results is received.

Figure 4:
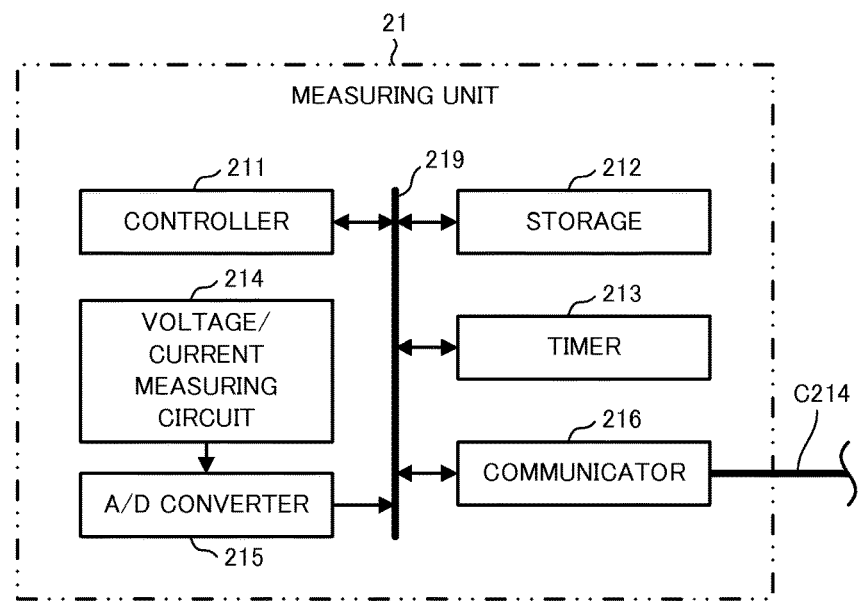
FIG. 4 is a block diagram showing the configuration of a measuring unit.

The measuring unit 21 has, as shown in FIG. 4, a controller 211, a storage 212, a timer 213, a voltage/current measuring circuit 214, an A/D converter 215, and a communicator 216. The storage 212, timer 213, A/D converter 215, and communicator 216 are all connected to the controller 211 via an internal bus 219.

The controller 211 comprises, for example, a CPU (central processing unit), a RAM (random access memory), and the like. The controller 211 executes programs stored in the storage 212 to execute the procedure described later.

The storage 212 is configured to include a nonvolatile memory such as a flash memory. The storage 212 stores programs executed by the controller 211 and data such as measurement results.

The timer 213 comprises, for example, a crystal resonator or the like. The timer 213 measures the elapsed time since a given time upon request from the controller 211 and notifies the controller 211 of the measured time.

The voltage/current measuring circuit 214 is a circuit measuring the values of the voltage and current applied to a given electric line. The voltage/current measuring circuit 214 sends analog signals presenting the measurement results to the A/D converter 215.

The A/D converter 215 converts the analog signals sent from the voltage/current measuring circuit 214 to digital signals. Then, the A/D converter 215 notifies the controller 211 of the measurement results using the digital signals.

The communicator 216 is a communication interface for communication by the first protocol via the transmission channel C214. The communicator 216 relays communication between the controller 211 and the switcher 40 connected via the transmission channel C214.

The measuring units 22 and 23 have the same configuration as the measuring unit 21.

The switcher 40 is a device relaying communication by the first protocol between any of the measuring units 21 to 23 and the converter 50. Furthermore, the switcher 40 switches the transmission channel connecting any of the measuring units 21 to 23 and the converter 50 to the transmission channel specified by the host 30.

Figure 5:
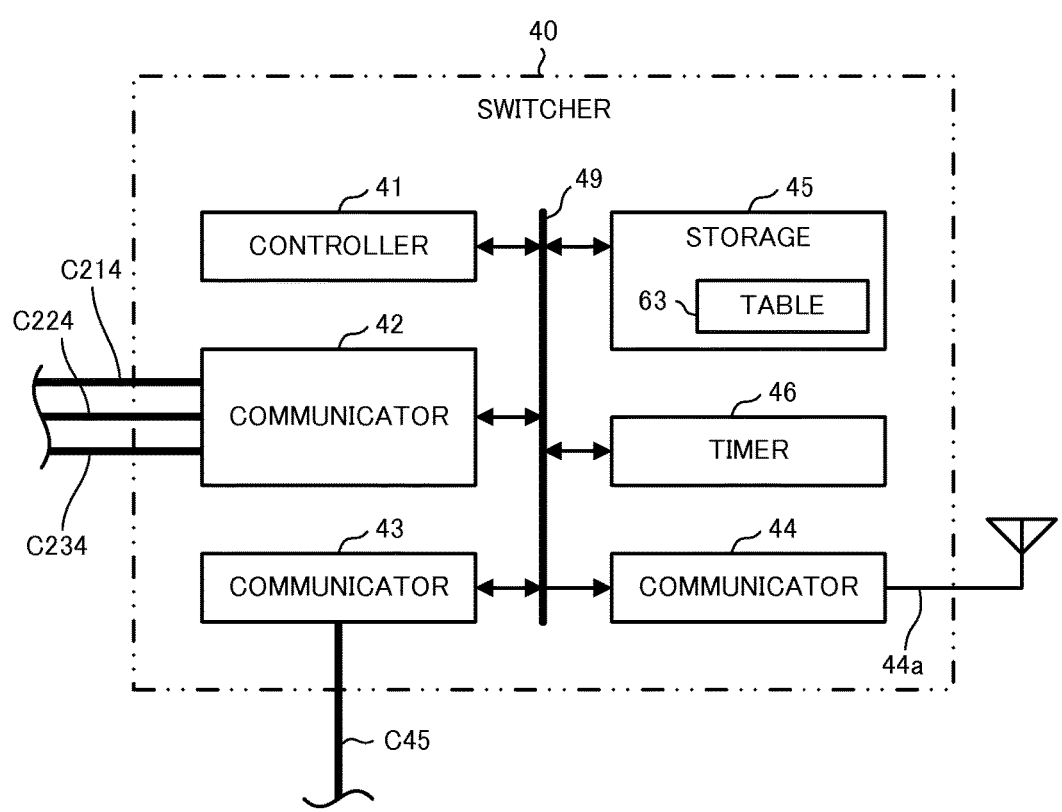
FIG. 5 is a block diagram showing the configuration of the switcher.

The switcher 40 has, as shown in FIG. 5, a controller 41, communicators 42, 43, and 44, a storage 45, and a timer 46. The communicators 42, 43, and 44, storage 45, and timer 46 are all connected to the controller 41 via an internal bus 49.

The controller 41 comprises, for example, a CPU, a RAM, and the like. The controller 41 executes programs stored in the storage 45 to execute the procedure described later.

The communicator 42 is a communication interface for communication by the first protocol via the transmission channels C214, C224, and C234. The communicator 44 relays communication between the controller 41 and the measuring units 21 to 23 connected via the transmission channels C214, C224, and C234.

Figure 6:
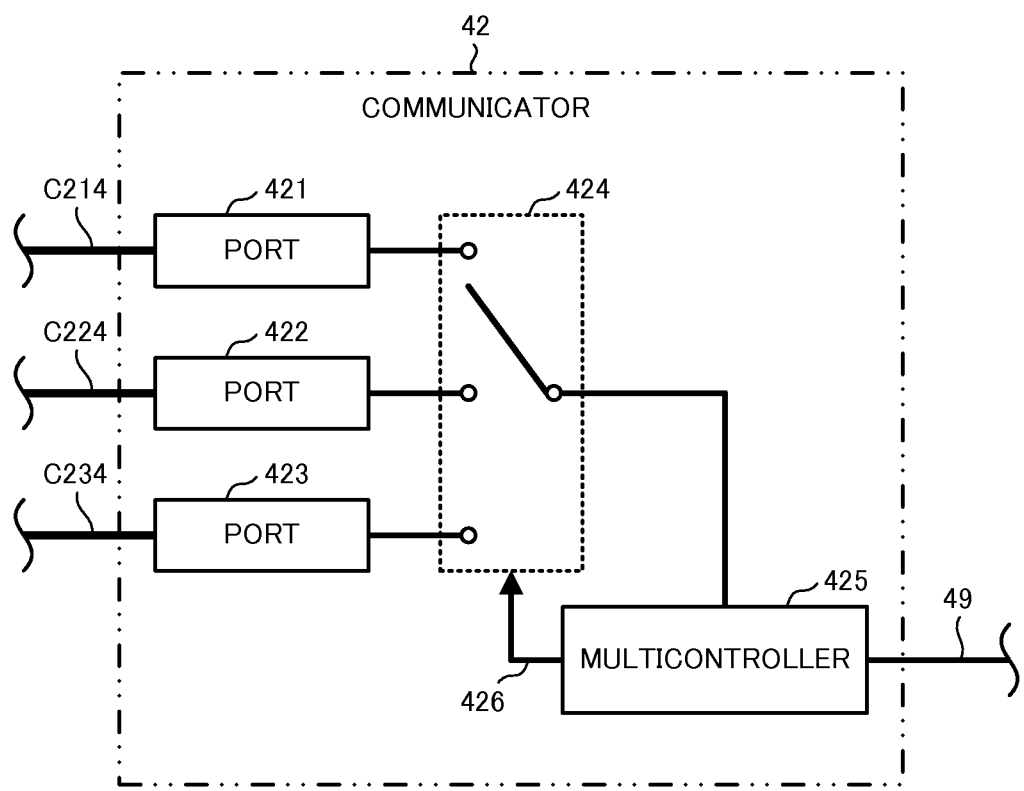
FIG. 6 is a block diagram showing the configuration of the communicator.

The communicator 42 has, as shown in FIG. 6, ports 421, 422, and 423, a changeover switch 424, a multicontroller 425, and a control line 426 for controlling the changeover switch 424.

The ports 421 to 423 are terminals for outputting signals via the transmission channels C214 to C234, respectively. Furthermore, the ports 421 to 423 are terminals for receiving signals entered via the transmission channels C214 to C234, respectively.

The changeover switch 424 connects any of the ports 421 to 423 to the multicontroller 425 according to instructions from the multicontroller 425. The channel connected by the changeover switch 424 becomes the transmission channel of signals of the first protocol.

The multicontroller 425 is connected to the internal bus 49. Furthermore, the multicontroller 425 controls the changeover switch 424 using the control line 426 according to instructions from the controller 41.

In the following explanation, the state of a port in which signals are transmittable to/from the multicontroller 425 is simply termed on. On the other hand, the state of a port that is not on is simply termed off.

Returning to FIG. 5, the communicator 43 is a communication interface for communication by the first protocol via the transmission channel C45. The communicator 43 relays communication between the controller 41 and the converter 50 connected via the transmission channel C45.

The communicator 44 is a communication interface for communication by the second protocol via the wireless transmission channel C34. The communicator 44 relays communication between the controller 41 and host 30 using an antenna 44a.

The storage 45 is configured to include a nonvolatile memory such as a flash memory. The storage 45 stores programs executed by the controller 41 and data such as a table 63.

Figure 7:
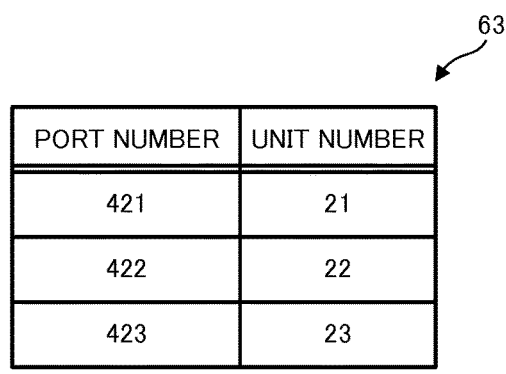
FIG. 7 is an illustration showing an example of the table.

The table 63 is data associating port numbers for identifying the ports 421 to 423 and unit numbers for identifying the measuring units 21 to 23 as shown in FIG. 7. For understanding of explanation, the reference numbers of the ports 421 to 423 and the port numbers are the same in the following description. For example, a port number "421" is the number to identify the port 421. Furthermore, the reference numbers of the measuring units 21 to 23 and the unit numbers are the same in the following description.

The timer 46 comprises, for example, a crystal resonator or the like. The timer 46 measures the elapsed time since a given time upon request from the controller 41 and notifies the controller 41 of the measured time.

The converter 50 converts signals transmitted on the transmission channel C45 in compliance with the first protocol to signals transmitted on the transmission channel C35 in compliance with the second protocol. The converter 50 further converts signals transmitted in compliance with the second protocol to signals transmitted in compliance with the first protocol. For example, the converter 50 deletes the transmission destination address and transmission source address from a request frame received via the transmission channel C35 and sends the request frame to the transmission channel C45. Furthermore, the converter 50 adds a transmission destination address and translation source address to a response frame received via the transmission channel C45 and sends the response frame to the transmission channel C35.

Figure 8:
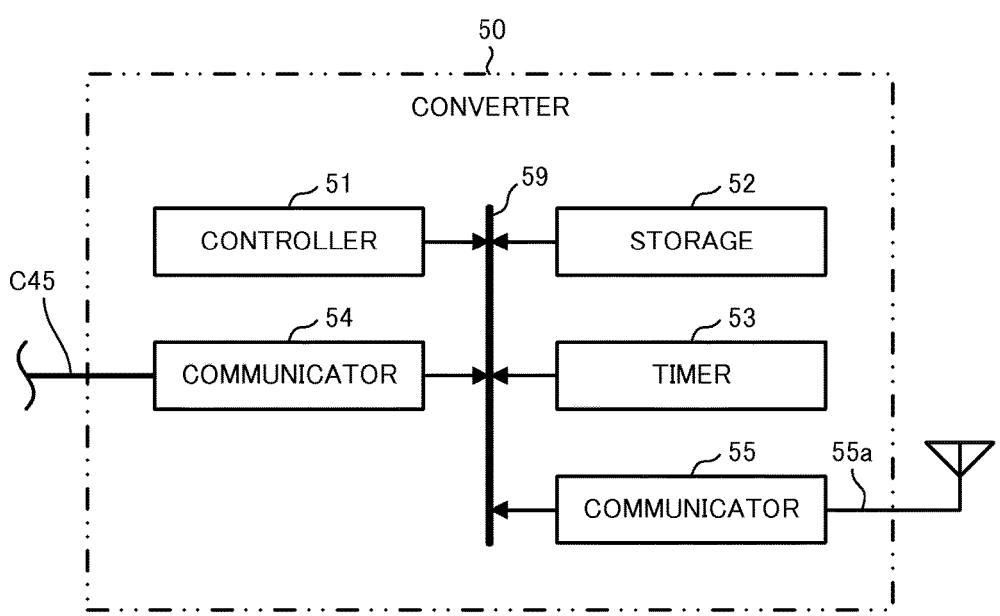
FIG. 8 is a block diagram showing the configuration of the converter.

The converter 50 has, as shown in FIG. 8, a controller 51, a storage 52, a timer 53, and communicators 54 and 55. The storage 52, timer 53, and communicators 54 and 55 are all connected to the controller 51 via an internal bus 59.

The controller 51 comprises, for example, a CPU, a RAM, and the like. The controller 51 executes programs stored in the storage 52 to execute the procedure described later.

The storage 52 is configured to include a nonvolatile memory such as a flash memory. The storage 52 stores programs executed by the controller 51, other parameters, and the like.

The timer 53 comprises, for example, a crystal resonator or the like. The timer 53 measures the elapsed time since a given time upon request from the controller 51 and notifies the controller 51 of the measured time.

The communicator 54 is a communication interface for communication by the first protocol via the transmission channel C45. The communicator 54 relays communication between the controller 51 and the switcher 40 connected via the transmission channel C45.

The communicator 55 is a communication interface for communication by the second protocol via the wireless transmission channel C35. The communicator 55 relays communication between the controller 51 and host 30 using an antenna 55a.

The host 30 is a communication device such as a tablet terminal. The host 30 specifies any of the measuring units 21 to 23 to the switcher 40 and communicates with the specified measuring unit via the converter 50. For example, the host 30 periodically requests measurement results from the measuring units 21 to 23 to collect the measurement results. Then, the host 30 displays the collected measurement results to the user of the host 30.

Figure 9:
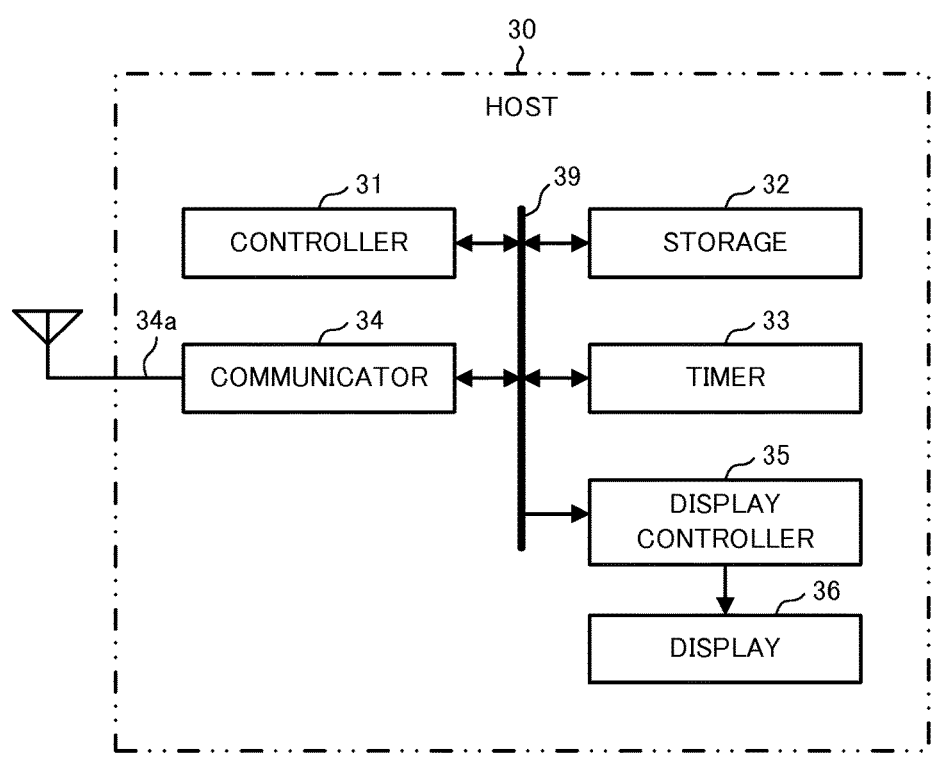
FIG. 9 is a block diagram showing the configuration of the host.

The host 30 has, as shown in FIG. 9, a controller 31, a storage 32, a timer 33, a communicator 34, a display controller 35, and a display 36. The storage 32, timer 33, communicator 34, and display controller 35 are all connected to the controller 31 via an internal bus 39.

The controller 31 comprises, for example, a CPU, a RAM, and the like. The controller 31 executes programs stored in the storage 32 to execute the procedure described later.

The storage 32 is configured to include a nonvolatile memory such as a flash memory. The storage 32 stores programs executed by the controller 31, other parameters, and the like.

The timer 33 comprises, for example, a crystal resonator or the like. The timer 33 measures the elapsed time since a given time upon request from the controller 31 and notifies the controller 31 of the measured time.

The communicator 34 is a communication interface for communication by the second protocol via the wireless transmission channels C34 and C35. Using an antenna 34a, the communicator 34 relays communication between the controller 31 and switcher 40 and relays communication between the controller 31 and converter 50.

The display controller 35 is a circuit controlling the display 36. The display controller 35 displays given characters and images on the screen of the display 36 according to instructions from the controller 31. The display 36 is, for example, an LCD (liquid crystal display) and has a screen for displaying characters and images to the user.

Figure 10:
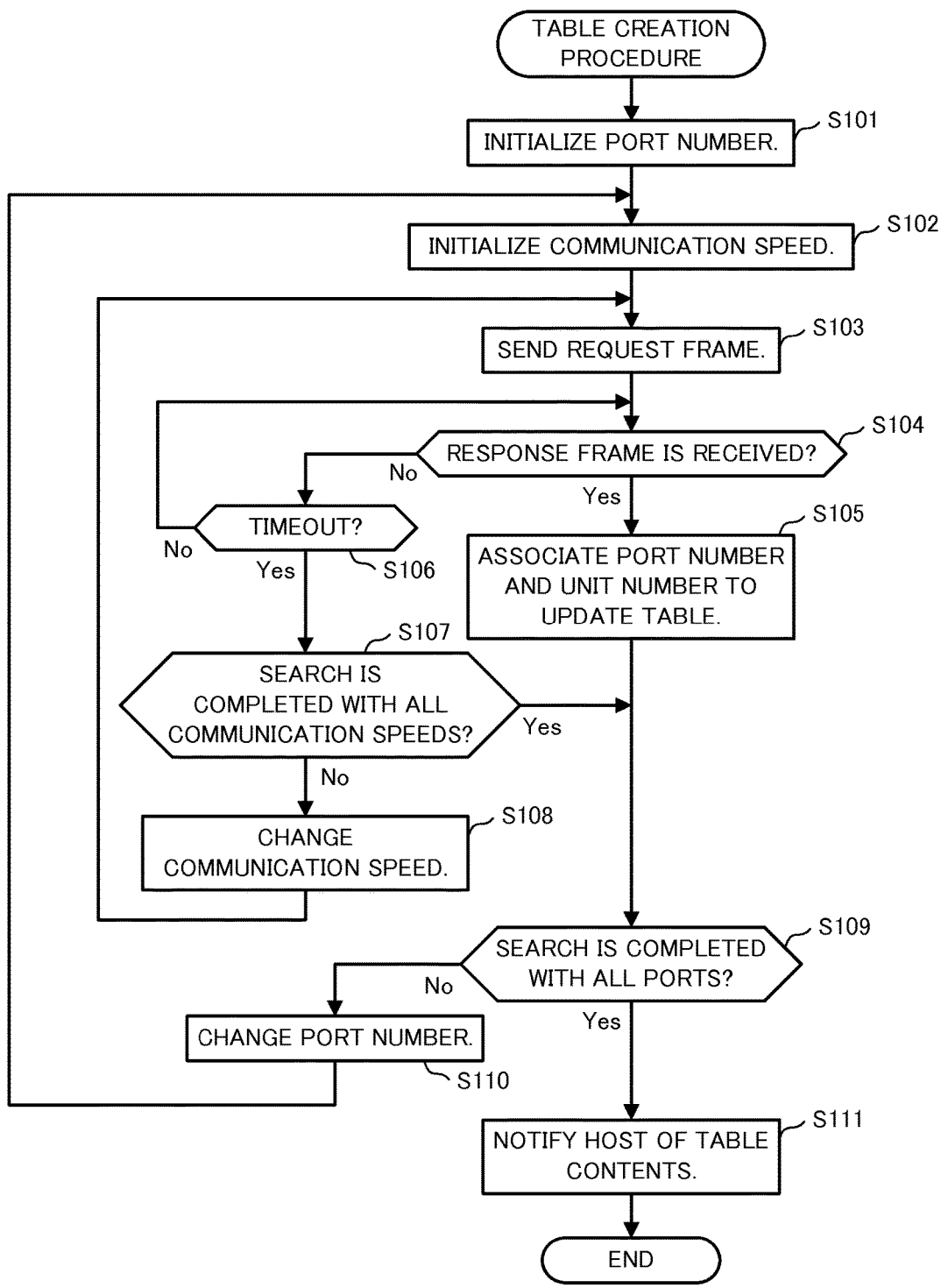
FIG. 10 is a flowchart showing the table creation procedure.

The table creation procedure executed by the switcher 40 will be described hereafter using FIG. 10. In the table creation procedure, a table associating unit numbers and port numbers is created. The table creation procedure is executed when a given button for executing initial setting is pressed by the user or when the host 30 orders the start of initial setting.

In the table creation procedure, the controller 41 of the switcher 40 first initializes the port number (Step S101). More specifically, the controller 41 turns on the port 421. Furthermore, the controller 41 saves a port number "421" in the RAM as an initial value.

Then, the controller 41 initializes the communication speed (Step S102). For example, the controller 41 saves a communication speed "10 Mbps" in the RAM as an initial value.

Then, the controller 41 sends a given request frame (Step S103). More specifically, the controller 41 sends a request frame from the port that is on at the communication speed saved in the RAM.

Then, the controller 41 determines whether a response frame is received via the port that is on (Step S104).

If a response frame is received (Step S104; Yes), the controller 41 associates the port number and a unit number to update the table (Step S105). More specifically, the controller 41 associates the port number saved in the RAM with a unique number as a unit number to update the table. As a result, for example, a row of data constituting the table 63 in FIG. 7 is added. Subsequently, the controller 41 advances the processing to Step S109.

On the other hand, if no response frame is received (Step S104; No), the controller 41 determines whether the timeout has occurred (Step S106). More specifically, the controller 41 determines whether a given length of time has elapsed without receiving a response frame since the request frame was sent in the Step S103. If the timeout has not occurred (Step S106; No), the controller 41 repeats the processing of the Step S104 and subsequent steps.

On the other hand, if the timeout has occurred (Step S106; Yes), the controller 41 determines whether the search is completed with all communication speeds (Step S107). More specifically, the controller 41 determines that the search is completed when the communication speed saved in the RAM is "1 Gbps."

If the search is not completed (Step S107; No), the controller 41 changes the communication speed saved in the RAM (Step S108). More specifically, if the communication speed "10 Mbps" is saved in the RAM, the controller 41 updates the communication speed to "100 Mbps." Furthermore, if the communication speed "100 Mbps" is saved in the RAM, the controller 41 updates the communication speed to "1 Gbps."

Subsequently, the controller 41 repeats the processing of the Step S103 and subsequent steps. As a result, communication between the switcher 40 and any of the measuring units 21 to 23 has been tried at each of multiple communication speeds.

On the other hand, if the search is completed (Step S107; Yes), the controller 41 advances the processing to Step S109.

In the Step S109, the controller 41 determines whether the search is completed with all ports. More specifically, the controller 41 determines whether every port number "421," "422," and "423" is associated with a unit number.

If the search is not completed (Step S109; No), the controller 41 updates the port number saved in the RAM (Step S110). More specifically, the controller 41 increases the value of the port number saved in the RAM by 1. Subsequently, the controller 41 repeats the processing of the Step S102 and subsequent steps.

On the other hand, if the search is completed (Step S109; Yes), the controller 41 notifies the host 30 of the contents of the table via the transmission channel C34 (Step S111). Subsequently, the controller 41 ends the table creation procedure.

The procedure executed by the host 30 will be described hereafter using FIG. 11.

Figure 11:
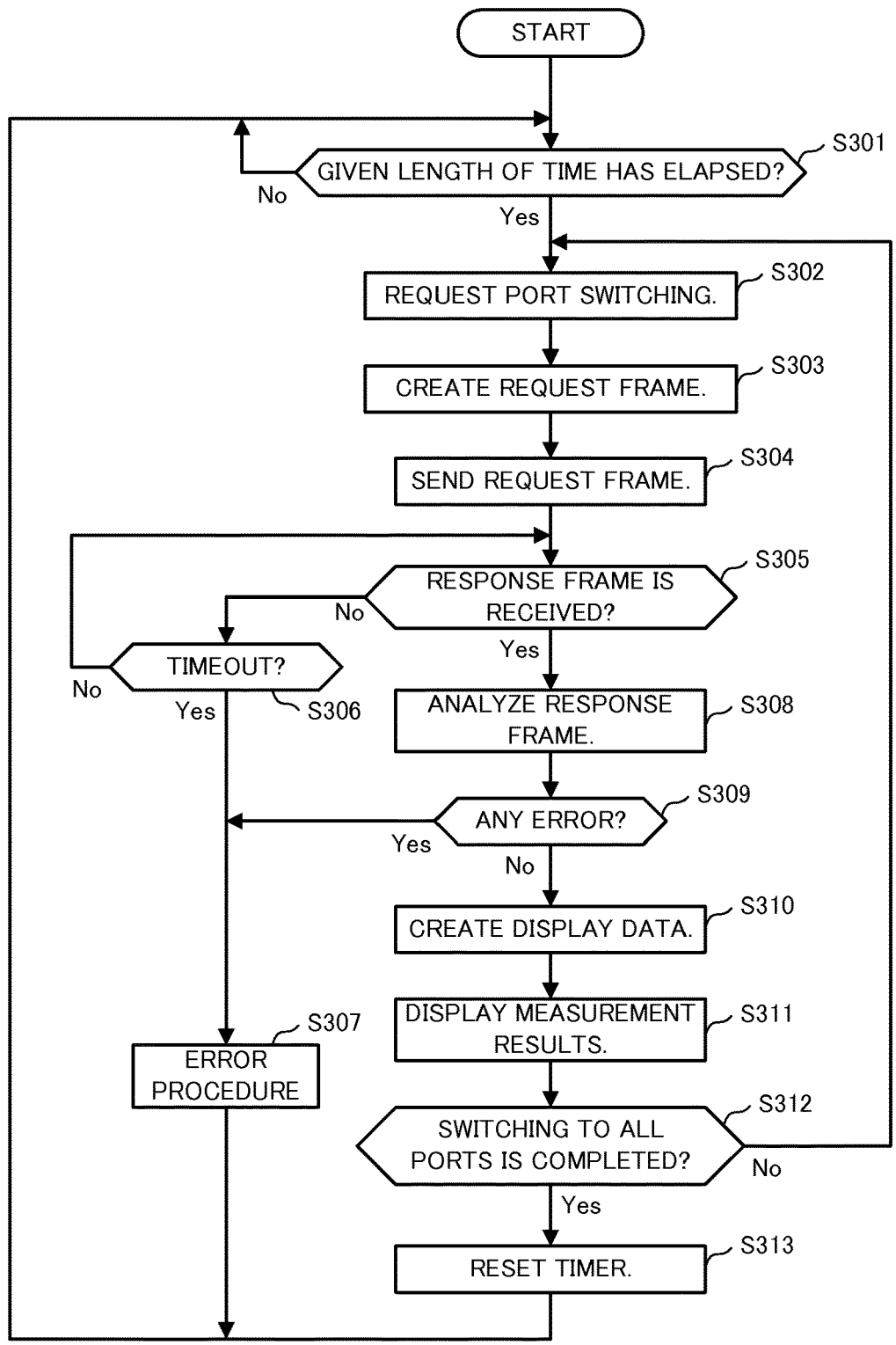
FIG. 11 is a flowchart showing the procedure executed by the host.

As shown in FIG. 11, the controller 31 of the host 30 first determines whether a given length of time measured by the timer 33 has elapsed (Step S301). The given length of time is, for example, one minute. When the Step S301 is executed for the first time, the timer 33 has not measured the time. In such a case, the controller 31 assumes the determination of the Step S301 to be affirmative.

If a given length of time has not elapsed (Step S301; No), the controller 31 repeats the determination of the Step S301.

On the other hand, if a given length of time has elapsed (Step S301; Yes), the controller 31 requests the switcher 40 to switch the port (Step S302). More specifically, the controller 31 sends a frame containing a given unit number via the transmission channel C34. The switcher 40 turns on the port corresponding to the unit number. As a result, the ports 421, 422, and 423 are repeatedly turned on in this order each time the Step S302 is executed.

Then, the controller 31 creates a request frame (Step S303). The request frame contains the unit number corresponding to the port turned on in the Step S302 as the transmission destination of the request frame.

Then, the controller 31 sends the request frame via the transmission channel C35 (Step S304).

Then, the controller 31 determines whether a response frame is received via the transmission channel C35 (Step S305).

If no response frame is received (Step S305; No), the controller 31 determines whether the timeout has occurred (Step S306). More specifically, the controller 31 determines whether a given length of time has elapsed without receiving a response frame since the request frame was sent in the Step S304.

If the timeout has not occurred (Step S306; No), the controller 31 repeats the processing of the Step S305 and subsequent steps.

On the other hand, if the timeout has occurred (Step S306; Yes), the controller 31 executes an error procedure (Step S307). The error procedure include recovery operations and/or display of error details to the user. Subsequently, the controller 31 repeats the processing of the Step S301 and subsequent steps.

If a response frame is received in the Step S305 (Step S305; Yes), the controller 31 analyzes the contents of the response frame (Step S308).

Then, the controller 31 determines whether the contents of the response frame contain any error (Step S309). If any error is contained (Step S309; Yes), the controller 31 executes the error procedure of the Step S307.

On the other hand, if no error is contained (Step S309; No), the controller 31 creates display data based on the measurement results contained in the response frame (Step S310). The display data are data for displaying the measurement results on the screen of the display 36.

Then, the controller 31 outputs the display data to the display controller 35 to display the measurement results on the display 36 (Step S311).

Then, the controller 31 determines whether the switching to all ports is completed (Step S312). More specifically, the controller 31 determines whether a cycle of switching to the ports 421 to 423 is completed. For example, the controller 31 determines that the switching to all ports is completed when the switching to the port 423 was requested in the last execution of the Step S302.

If the switching is not completed (Step S312; No), the controller 31 repeats the processing of the Step S302 and subsequent steps. On the other hand, if the switching is completed (Step S312; Yes), the controller 31 resets the time measured by the timer 33 (Step S313).

Subsequently, the controller 31 repeats the processing of the Step S301 and subsequent steps. As a result, the measurement results output from the measuring units 21 to 23 in every minute are displayed to the user.

The procedure executed by the converter 50 will be described hereafter using FIG. 12.

Figure 12:
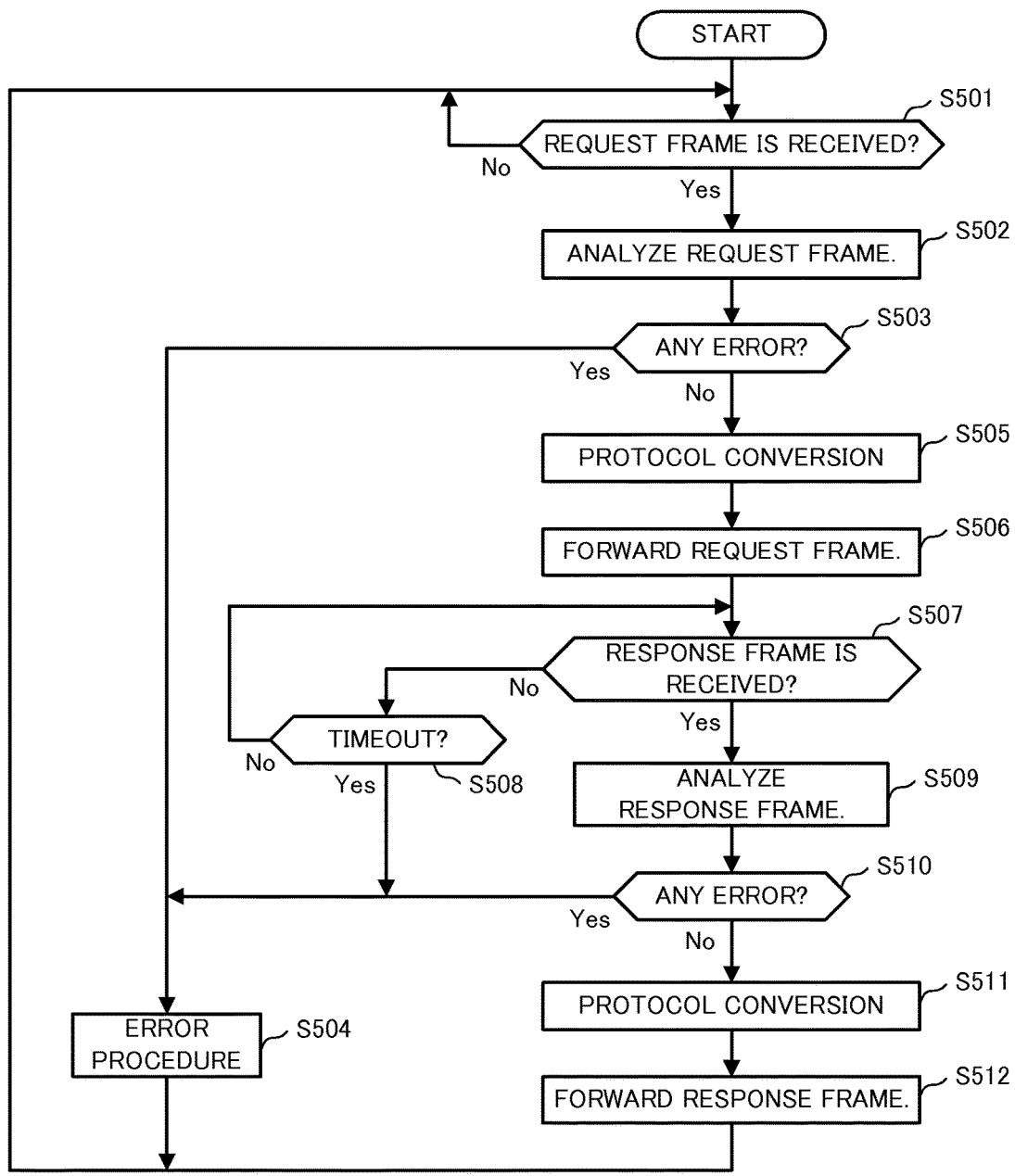
FIG. 12 is a flowchart showing the procedure executed by the converter.

As shown in FIG. 12, the controller 51 of the converter 50 first determines whether a request frame is received from the host 30 via the transmission channel C35 (Step S501). If no request frame is received (Step S501; No), the controller 51 repeats the determination of the Step S501.

On the other hand, if a request frame is received (Step S501; Yes), the controller 51 analyzes the request frame (Step S502).

Then, the controller 51 determines whether the contents of the request frame contain any error (Step S503). If any error is contained (Step S503; Yes), the controller 51 executes an error procedure (Step S504). Subsequently, the controller 51 repeats the processing of the Step S501 and subsequent steps.

On the other hand, if no error is contained (Step S503; No), the controller 51 converts the protocol of the request frame (Step S505). More specifically, the controller 51 deletes the transmission destination address and transmission source address from the request frame in compliance with the second protocol to create a request frame in compliance with the first protocol.

Then, the controller 51 forwards the request frame to the switcher 40 via the transmission channel C45 (Step S506).

Then, the controller 51 determines whether a response frame is received from the switcher 40 via the transmission channel C45 (Step S507).

If no response frame is received (Step S507; No), the controller 51 determines whether the timeout has occurred (Step S508). More specifically, the controller 51 determines whether a given length of time has elapsed without receiving a response frame since the request frame was sent in the Step S506.

If the timeout has not occurred (Step S508; No), the controller 51 repeats the processing of the Step S507 and subsequent steps. On the other hand, if the timeout has occurred (Step S508; Yes), the controller 51 executes the error procedure of the Step S504.

If a response frame is received in the Step S507 (Step S507; Yes), the controller 51 analyzes the content of the response frame (Step S509).

Then, the controller 51 determines whether the contents of the response frame contain any error (Step S510). If any error is contained (Step S510; Yes), the controller 51 executes the error procedure of the Step S504.

On the other hand, if no error is contained (Step S510; No), the controller 51 converts the protocol of the response frame (Step S511). More specifically, the controller 51 adds a transmission destination address and transmission source address to the response frame in compliance with the first protocol to create a response frame in compliance with the second protocol. Here, the added transmission destination address is the address indicating the host 30 and the added transmission source address is the address indicating the converter 50.

Then, the controller 51 forwards the response frame to the host 30 via the transmission channel C35 (Step S512). Subsequently, the controller 51 repeats the processing of the Step S501 and subsequent steps.

The procedure executed by the switcher 40 will be described hereafter using FIG. 13.

Figure 13:
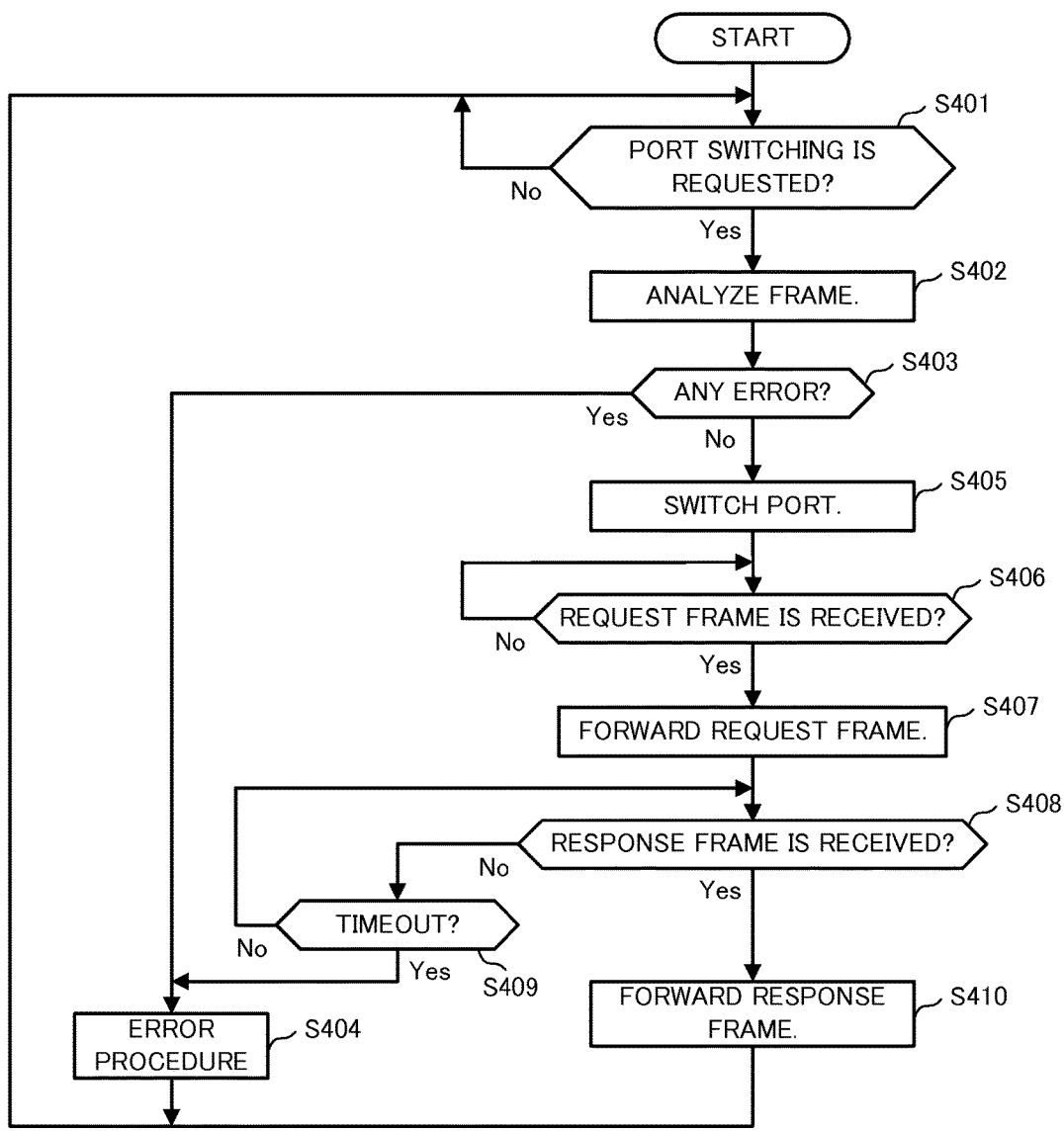
FIG. 13 is a flowchart showing the procedure executed by the switcher.

As shown in FIG. 13, the controller 41 of the switcher 40 first determines whether a port switching request is made by the host 30 (Step S401). More specifically, the controller 41 determines whether a frame containing a unit number is received via the transmission channel C34. If no port switching request is made (Step S401; No), the controller 41 repeats the determination of the Step S401.

On the other hand, if a port switching request is made (Step S401; Yes), the controller 41 analyzes the frame received via the transmission channel C34 (Step S402).

Then, the controller 41 determines whether the frame contains any error (Step S403). If an error is contained (Step S403; Yes), the controller 41 executes an error procedure (Step S404). Subsequently, the controller 41 repeats the processing of the Step S401 and subsequent steps.

On the other hand, if no error is contained (Step S403; No), the controller 41 switches the port (Step S405). More specifically, the controller 41 makes reference to the table 63 and turns on the port corresponding to the unit number contained in the frame.

Then, the controller 41 determines whether a request frame is received via the transmission channel C45 (Step S406). If no request frame is received (Step S406; No), the controller 41 repeats the determination of the Step S406.

On the other hand, if a request frame is received (Step S406; Yes), the controller 41 forwards the request frame via the port that is on (Step S407).

Then, the controller 41 determines whether a response frame is received via the port that is on (Step S408).

If no response frame is received (Step S408; No), the controller 41 determines whether the timeout has occurred (Step S409). More specifically, the controller 41 determines whether a given length of time has elapsed without receiving a response frame since the request frame was forwarded in the Step S407.

If the timeout has not occurred (Step S409; No), the controller 41 repeats the processing of the Step S408 and subsequent steps. On the other hand, if the timeout has occurred (Step S409; Yes), the controller 51 executes the error procedure of the Step S404.

If a response frame is received in the Step S408 (Step S408; Yes), the controller 41 forwards the response frame via the transmission channel C45 (Step S410). Subsequently, the controller 41 repeats the processing of the Step S401 and subsequent steps.

The procedure executed by the measuring unit 21 will be described hereafter using FIG. 14. The measuring units 22 and 23 execute the same procedure as the measuring unit 21.

Figure 14:
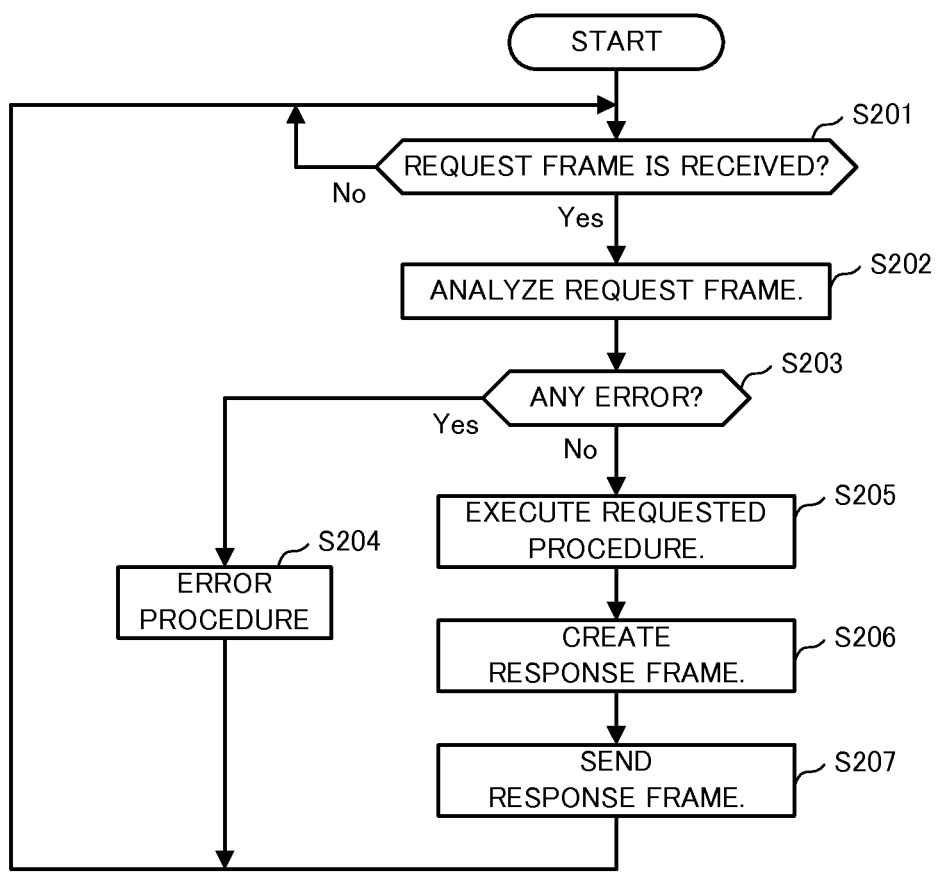
FIG. 14 is a flowchart showing the procedure executed by a measuring unit.

As shown in FIG. 14, the controller 211 of the measuring unit 21 first determines whether a request frame is received from the switcher 40 (Step S201). If no request frame is received (Step S201; No), the controller 211 repeats the determination of the Step S201.

On the other hand, if a request frame is received (Step S201; Yes), the controller 211 analyzes the contents of the request frame (Step S202).

Then, the controller 211 determines whether the contents of the request frame contain any error (Step S203). If any error is contained (Step S203; Yes), the controller 211 executes an error procedure (Step S204). Subsequently, the controller 211 repeats the processing of the Step S201 and subsequent steps.

On the other hand, if no error is contained (Step S203; No), the controller 211 executes the procedure requested with the request frame (Step S205). The procedure is, for example, to measure the electric power, to read measurement results stored in the storage 212, or the like.

Then, the controller 211 creates a response frame (Step S206). Subsequently, the controller 211 sends the created response frame to the switcher 40 (Step S207). Then, the controller 211 repeats the processing of the Step S201 and subsequent steps.

Figure 15:
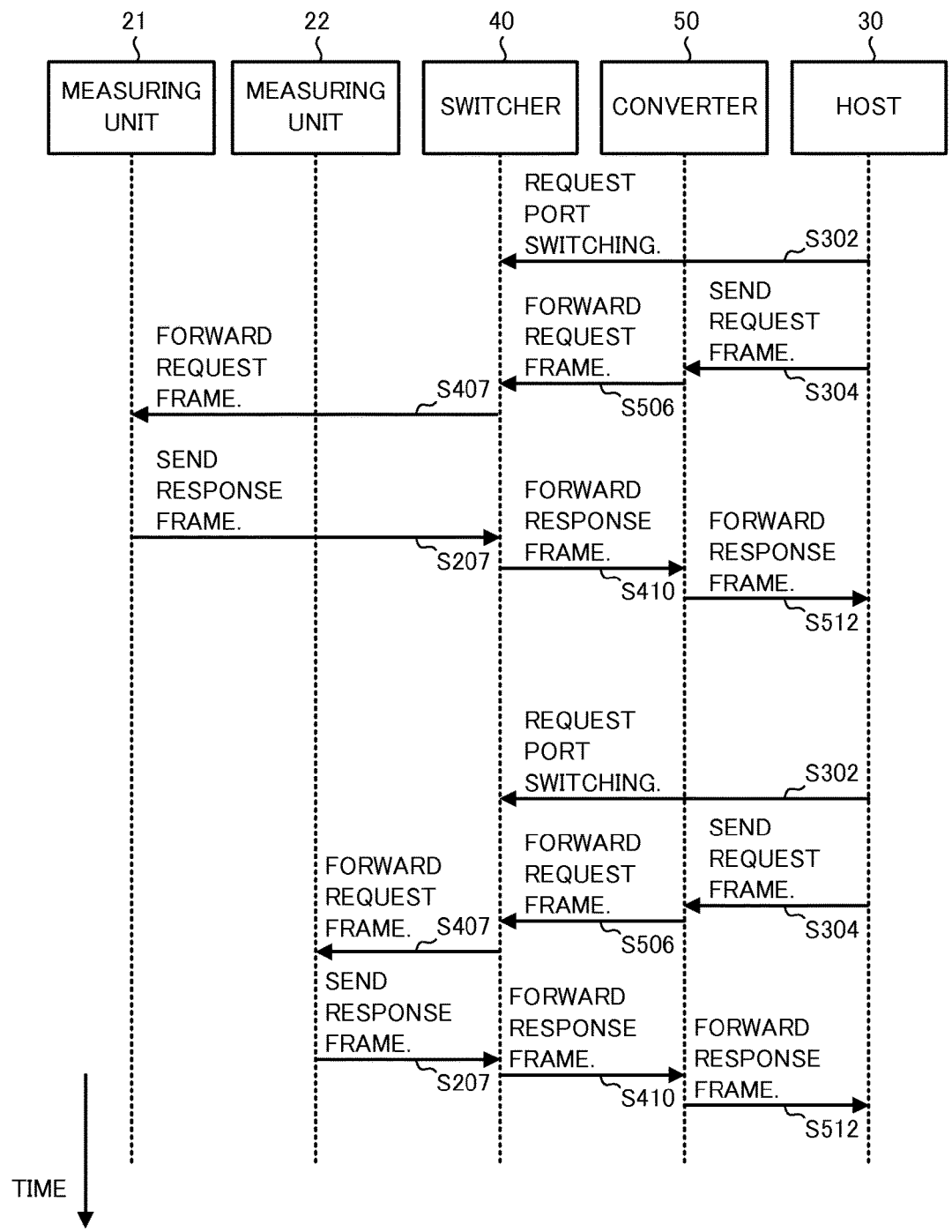
FIG. 15 is a timeline chart showing the operation regarding measurement results request and response.

FIG. 15 shows the communication sequence among the measuring units 21 and 22, switcher 40, converter 50, and host 30 in order for the host 30 to acquire measurement results from the measuring units 21 and 22.

As shown in FIG. 15, the host 30 makes a port switching request for the switcher 40 in which a unit number "21" is specified (Step S302). The switcher 40 turns on the port 421 corresponding to the unit number so as to connect the measuring unit 21 and converter 50.

Then, the host 30 sends a request frame of the second protocol to the converter 50 (Step S304). The request frame contains the unit number "21" as the transmission destination address.

Then, the converter 50 converts the request frame of the second protocol to a request frame of the first protocol and forwards the request frame to the switcher 40 (Step S506). The switcher 40 forwards the request frame to the measuring unit 21 connected to the port 421 (Step S407).

Then, the measuring unit 21 performs measurement of the electric power and the like and sends a response frame of the first protocol to the switcher 40 (Step S207). The switcher 40 forwards the response frame to the converter 50 (Step S410).

Then, the converter 50 converts the response frame of the first protocol to a response frame of the second protocol and forwards the response frame to the host 30 (Step S512). Then, the host 30 displays the measurement results delivered by the response frame to the user.

Then, the host 30 makes a port switching request for the switcher 40 in which a unit number "22" is specified (Step S302). The switcher 40 turns on the port 422 corresponding to the unit number so as to connect the measuring unit 22 and converter 50.

Then, the host 30 sends a request frame containing the unit number "22" as the transmission destination address to the converter 50 (Step S304). The converter 50 converts the request frame of the second protocol to a request frame of the first protocol and forwards the request frame to the switcher 40 (Step S506). The switcher 40 forwards the request frame to the measuring unit 22 (Step S407).

Then, the measuring unit 22 performs measurement of the electric power and the like and sends a response frame to the switcher 40 (Step S207). The switcher 40 forwards the response frame to the converter 50 (Step S410). The converter 50 converts the response frame of the first protocol to a response frame of the second protocol and forwards the response frame to the host 30 (Step S512). Then, the host 30 displays the measurement results delivered by the response frame to the user.

As described above, in the signal conversion system 10 according to this embodiment, multiple measuring units 21 to 23 communicating in compliance with the first protocol and the host 30 communicating in compliance with the second protocol communicate with each other. The transmission channel of signals transmitted in this communication is switched by the switcher 40. As a result, there is no need of installing the converter 50 for each of the measuring units 21 to 23, whereby the preparation period required before starting the communication can be shortened.

Furthermore, the switcher 40 automatically creates the table 63 and notifies the host 30 of the table 63. Then, the host 30 makes a port switching request for the switcher 40 using the unit numbers contained in the table 63. As a result, the signal conversion system 10 can easily be installed.

Embodiment 2

Embodiment 2 will be described hereafter mainly in regard to the difference from the above-described Embodiment 1. The same or equivalent configurations as in the above-described embodiment are referred to by equivalent reference numbers and their explanation will be omitted or simplified.

The signal conversion system 10 according to this embodiment has the same configuration as that in Embodiment 1. However, the signal conversion system 10 according to this embodiment is different from Embodiment 1 in that the host 30 sends the same request frame via the transmission channels C34 and C35. Furthermore, the signal conversion system 10 according to this embodiment is different from Embodiment 1 in that the switcher 40 notifies the host 30 of the unit number of the measuring unit having sent a response frame.

Figure 16:
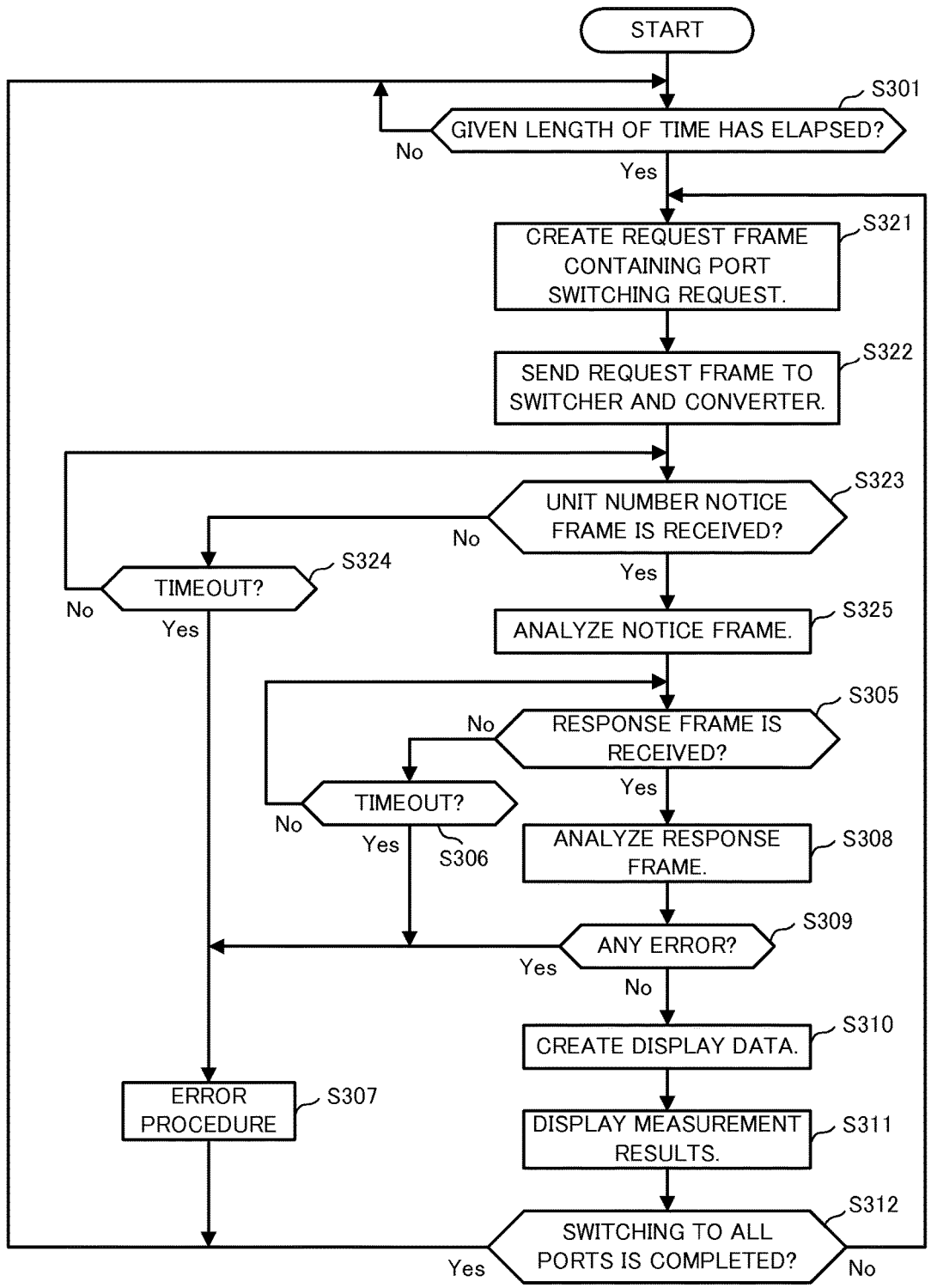
FIG. 16 is a flowchart showing the procedure executed by the host according to Embodiment 2.

FIG. 16 shows the procedure executed by the host 30 according to this embodiment. As shown in FIG. 16, if the determination of the Step S301 is affirmative (Step S301; Yes), the controller 31 of the host 30 creates a request frame containing a port switching request (Step S321). The request frame contains a unit number for specifying a port to turn on and data for requesting measurement results.

Then, the controller 31 sends the request frame to both the switcher 40 and converter 50 simultaneously (Step S322). More specifically, the controller 31 sends the request frame to the switcher 40 via the transmission channel C34 and sends the request frame to the converter 50 via the transmission channel C35.

Receiving the request frame sent in the Step S322, the switcher 40 ignores the portion irrelevant to the port switching request and switches the port. On the other hand, receiving the request frame sent in the Step S322, the converter 50 discards the portion relevant to the port switching request and executes the protocol conversion and forwarding.

Then, the controller 31 determines whether a unit number notice frame is received (Step S323). The notice frame is a frame for giving notice of the unit number of the measuring unit connected to the port that is on. Thus, the notice frame serves to give notice of the unit number of a measuring unit receiving a request frame and sending a response frame.

If no notice frame is received (Step S323; No), the controller 31 determines whether the timeout has occurred (Step S324). More specifically, the controller 31 determines whether a given length of time has elapsed without receiving a notice frame since the request frame was sent in the Step S322.

If the timeout has not occurred (Step S324; No), the controller 31 repeats the processing of the Step S323 and subsequent steps. On the other hand, if the timeout has occurred (Step S324; Yes), the controller 31 executes the error procedure of the Step S307.

If a notice frame is received in the Step S323 (Step S323; Yes), the controller 31 analyzes the notice frame (Step S325). As a result, the controller 31 can identify the measuring unit having sent a response frame before receiving the response frame.

Subsequently, the controller 31 executes the processing of the Step S305 and subsequent steps.

The procedure executed by the switcher 40 according to this embodiment will be described hereafter using FIG. 17.

Figure 17:
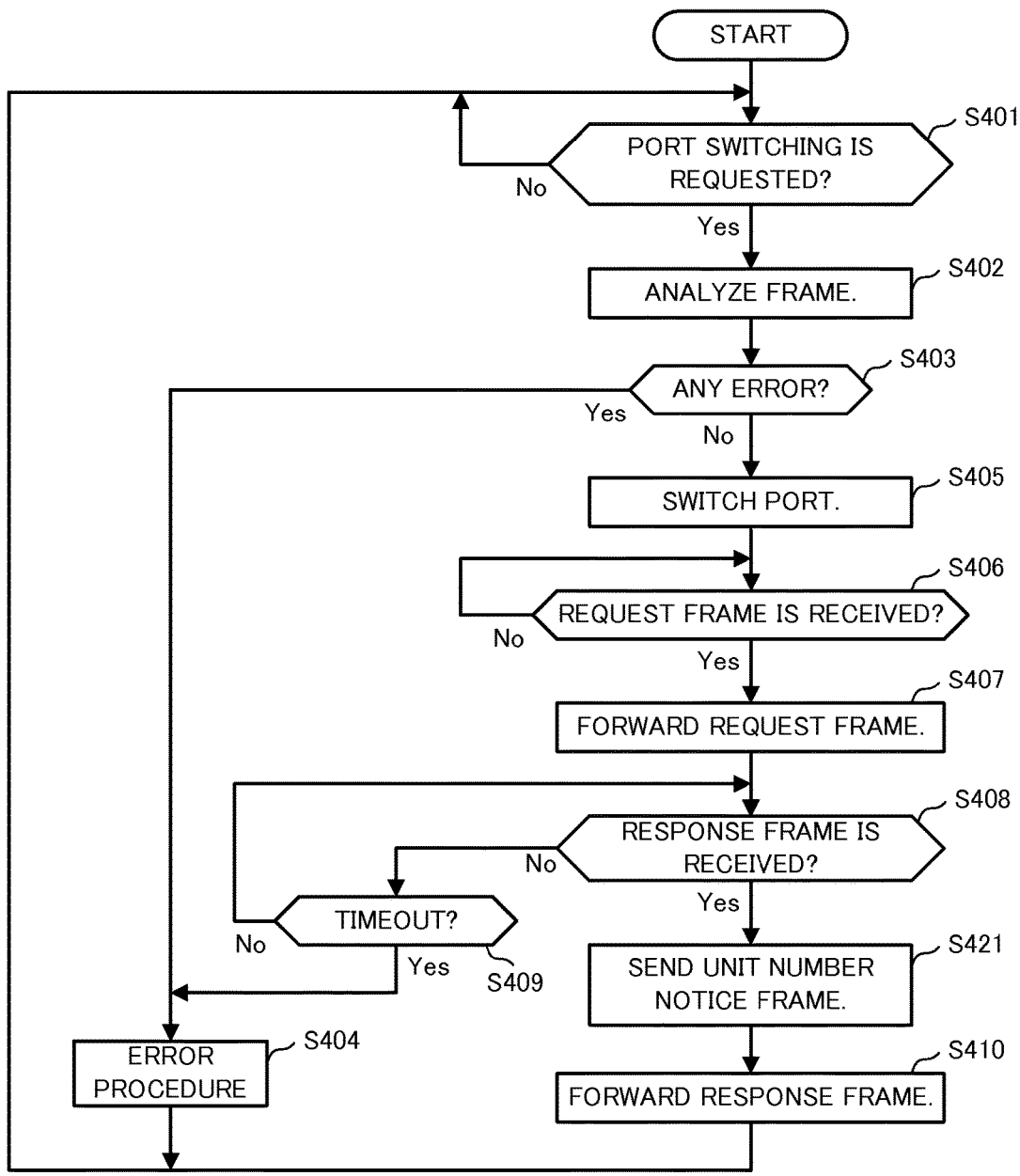
FIG. 17 is a flowchart showing the procedure executed by the switcher.

As shown in FIG. 17, when the determination of the Step S408 is affirmative (Step S408; Yes), the controller 41 of the switcher 40 sends a unit number notice frame (Step S421). More specifically, the controller 41 makes reference to the table 63 and creates a notice frame containing the unit number corresponding to the port that is on. Then, the controller 41 sends the created notice frame to the host 30 via the transmission channel C34. Subsequently, the controller 41 executes the processing of the Step S410 and subsequent steps.

Figure 18:
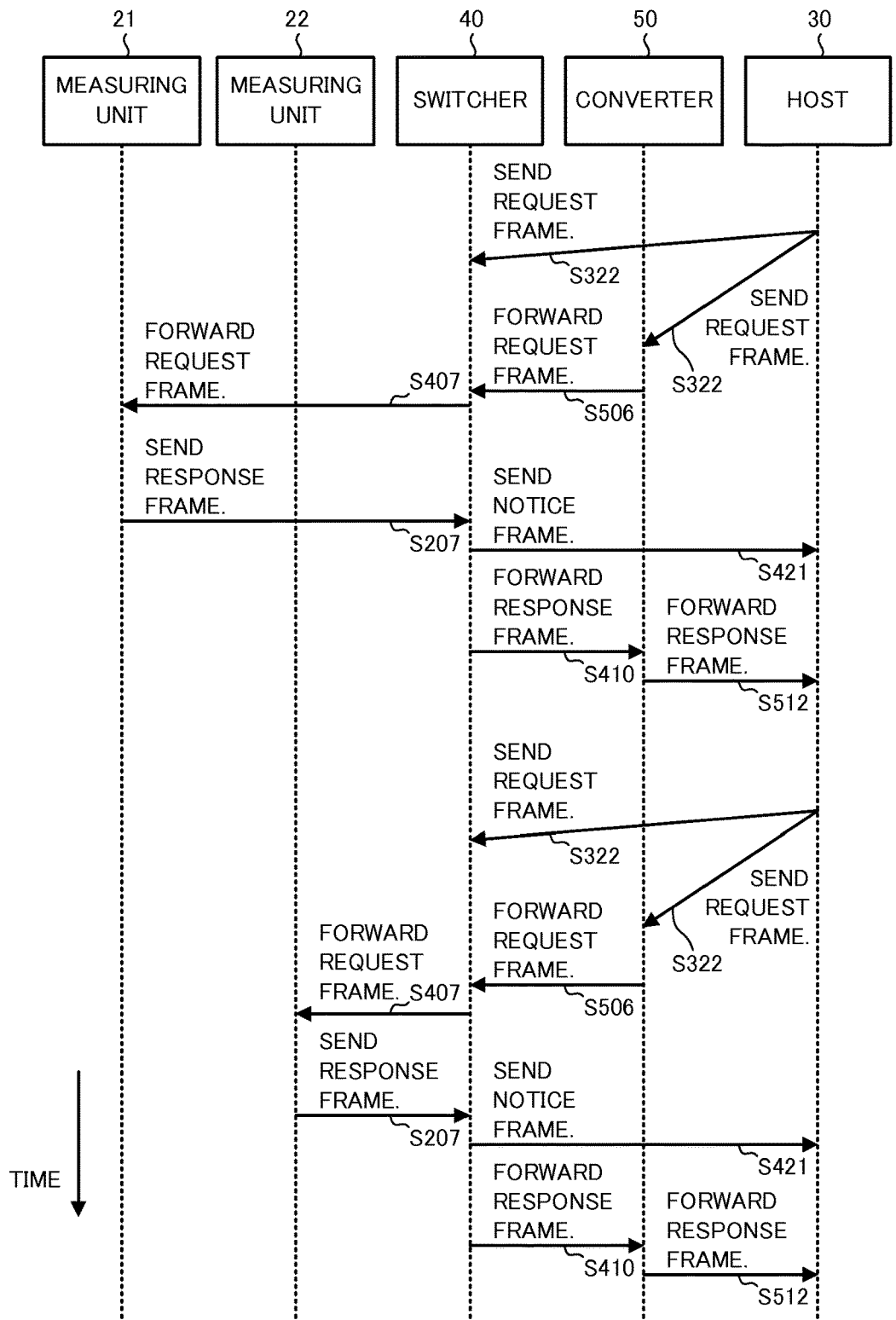
FIG. 18 is a timeline chart showing the operation regarding measurement results request and response.

FIG. 18 shows the communication sequence among the measuring units 21 and 22, switcher 40, converter 50, and host 30 in order for the host 30 according to this embodiment to acquire measurement results.

As shown in FIG. 18, the host 30 sends a request frame to both the switcher 40 and converter 50 (Step S322). The request frame contains a unit number "21" for switching the port and a unit number "21" for indicating the transmission destination of the request frame.

Receiving the request frame, the switcher 40 makes reference to the table 63 and turns on the port 421 corresponding to the unit number "21." As a result, the measuring unit 21 and converter 50 are connected.

Then, the converter 50 ignores information for switching the port and converts the request frame of the second protocol to a request frame of the first protocol. Then, the converter 50 forwards the request frame to the switcher 40 (Step S506). The switcher 40 forwards the request frame to the measuring unit 21 (Step S407).

Then, the measuring unit 21 performs measurement of the electric power and the like and sends a response frame of the first protocol to the switcher 40 (Step S207). The switcher 40 sends to the host 30 a notice frame containing the unit number "21" (Step S421). Furthermore, the switcher 40 forwards the response frame to the converter 50 (Step S410).

Then, the converter 50 converts the response frame of the first protocol to a response frame of the second protocol and sends the response frame to the host 30 (Step S512). Then, the host 30 displays the measurement results.

Then, the host 30 sends a request frame to both the switcher 40 and converter 50 (Step S322). The request frame contains a unit number "22" for switching the port and a unit number "22" for indicating the transmission destination of the data. Receiving the request frame, the switcher 40 turns on the port 422 to connect the measuring unit 22 and converter 50.

Then, the converter 50 ignores information for switching the port and converts the request frame of the second protocol to a request frame of the first protocol. Then, the converter 50 forwards the request frame to the switcher 40 (Step S506). The switcher 40 forwards the request frame to the measuring unit 22 (Step S407).

Then, the measuring unit 22 performs measurement of the electric power and the like and sends a response frame of the first protocol to the switcher 40 (Step S207). The switcher 40 sends to the host 30 a notice frame containing the unit number "22" (Step S421). Furthermore, the switcher 40 forwards the response frame to the converter 50 (Step S410).

Then, the converter 50 converts the response frame of the first protocol to a response frame of the second protocol and sends the response frame to the host 30 (Step S512). Then, the host 30 displays the measurement results.

As described above, the host 30 according to this embodiment sends a request frame to the switcher 40 and converter 50. As a result, the transmission channel connecting the measuring units 21 to 23 and host 30 can be switched with a smaller number of procedure steps than in Embodiment 1.

Furthermore, the switcher 40 sends a notice frame containing a unit number to the host 30. As a result, the host 30 can easily identify the measuring unit that is the transmission source of the response frame.

Embodiments of the present disclosure are described above. The present disclosure is not confined to the above-described embodiments.

Figure 19:
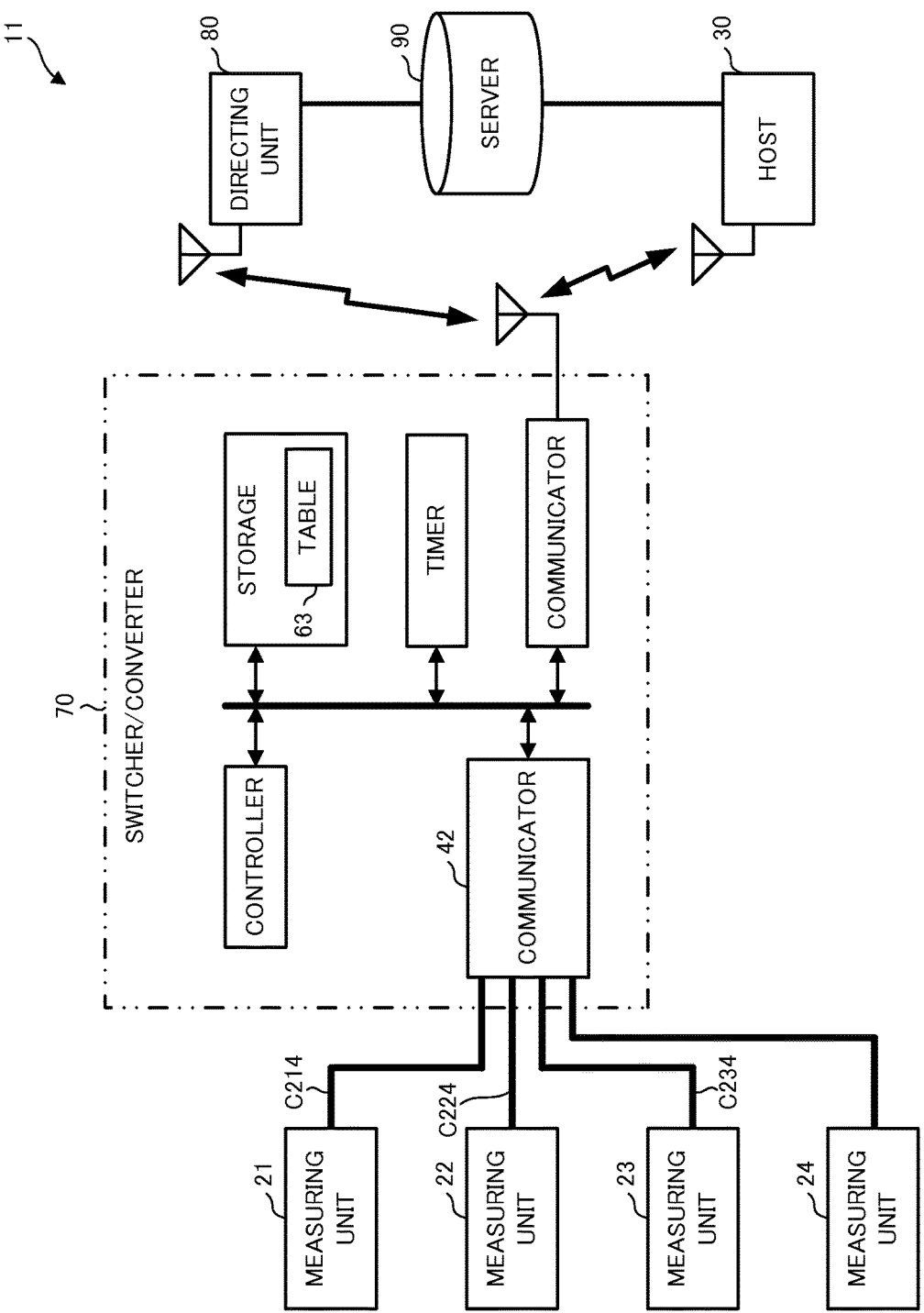
FIG. 19 is a block diagram showing the signal conversion system according to a modified embodiment.

For example, the above-described embodiments comprise three measuring units. However, two or less measuring units can be provided or four or more measuring units can be provided as shown in FIG. 19.

Furthermore, the switcher 40 and converter 50 according to the above-described embodiments are separate devices. This is not restrictive. For example, as shown in FIG. 19, a switcher/converter 70 having the functions of both of the switcher 40 and converter 50 can be used to configure a signal conversion system 11.

Furthermore, the host 30 according to the above-described embodiments orders switching of the port and communicates with the measuring units 21 to 23. This is not restrictive. For example, as shown in FIG. 19, a directing unit 80 directing switching of the port and the host 30 communicating with the measuring units 21 to 24 can be used to configure a signal conversion system 11.

Here, the directing unit 80 is a communication device directing the switcher/converter 70 to switch the port with reference to information stored in a server 90. Furthermore, the host 30 communicates with the measuring units 21 to 24 with reference to information stored in the server 90.

Moreover, the switcher/converter 70 in FIG. 19 can be configured to include the directing unit 80.

Furthermore, the transmission channels C34 and C35 according to the above-described embodiments are transmission channels used for wireless communication. However, the transmission channels C34 and C35 can be transmission channels used for wired communication such as cables.

Furthermore, in place of the measuring units 21 to 23 according to the above-described embodiments, some other communication devices can be used to configure the signal conversion system 10. For example, sensor units comprising a built-in temperature sensor or the like can be used. Besides, any communication devices communicating in compliance with the first protocol can be used.

Furthermore, the host 30 according to the above-described embodiments sends a request frame at given time intervals using the timer 33. This is not restrictive. For example, the host 30 can send a request frame only when the user conducts a given operation.

Furthermore, the measuring units 21 to 23 and host 30 communicate via one converter 50 in the above-described embodiments. However, the measuring units 21 to 23 and host 30 can communicate via two or more converters.

Furthermore, in the above-described Embodiment 2, the step S421 (see FIG. 17) is executed when the determination of the Step S408 is affirmative. However, the step S421 can be executed when the determination of the Step S406 is affirmative.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The signal conversion system and signal conversion method of the present disclosure are suitable for communication techniques for converting signal protocols.

REFERENCE SIGNS LIST 10, 11 Signal conversion system
21, 22, 23, 24 Measuring unit
214 Voltage/current measuring circuit
215 A/D converter
30 Host
31, 41, 51, 211 Controller
32, 45, 52, 212 Storage
33, 46, 53, 213 Timer
34, 42, 43, 44, 54, 55, 216 Communicator
34a, 44a, 55a Antenna
35 Display controller
36 Display
39, 49, 59, 219 Internal bus
40 Switcher
421, 422, 423 Port
424 Changeover switch
425 Multicontroller
426 Control line
50 Converter
61, 62 Frame
611, 623 Data length
612, 624 Data
613, 625 Check
621 Transmission destination address
622 Transmission source address
63 Table
70 Switcher/converter
80 Directing unit
90 Server
C214, C224, C234, C34, C35, C45 Transmission channel

The invention claimed is:

1. A signal conversion system, comprising:
a converter configured to
convert signals transmitted in compliance with a first protocol to signals transmitted in compliance with a second protocol different from the first protocol, the first protocol providing for communicating without specifying another party in a communication including mutually transmitting or receiving signals that do not contain information specifying a device of the another party in the communication, and
convert signals transmitted in compliance with the second protocol to signals transmitted in compliance with the first protocol;
a specifier configured to specify a second communication terminal among multiple second communication terminals transmitting or receiving signals in compliance with the first protocol to communicate with a first communication terminal via the converter; and
a switcher configured to switch a first transmission channel on which signals are transmitted between any of the multiple second communication terminals and the converter to a second transmission channel connecting the second communication terminal specified by the specifier and the converter, wherein the switcher is connectable to the converter via a third transmission channel, connectable to the specifier via a fourth transmission channel, and configured to send, via the fourth transmission channel, signals containing information for identifying the second communication terminal having sent signals in compliance with the first protocol, to the specifier in compliance with the second protocol.

2. The signal conversion system according to claim 1, wherein
the first communication terminal comprises the specifier.

3. The signal conversion system according to claim 2, wherein
the switcher comprises ports for connecting to each of the multiple second communication terminals, and is configured to connect a port, among the ports, for connecting to the second communication terminal specified through communication with the first communication terminal and the converter to switch the first transmission channel.

4. The signal conversion system according to claim 3, wherein
the first communication terminal is configured to send signals containing specification information for specifying the second communication terminal and communication information for communicating with the second communication terminal specified by the specification information to the switcher and converter in compliance with the second protocol, and
the converter is configured to delete the specification information from signals sent from the first communication terminal to create signals transmitted in compliance with the first protocol.

5. The signal conversion system according to claim 3, wherein
the switcher is configured to create a table associating port numbers for identifying the ports and terminal numbers for identifying the second communication terminals connected to the ports, and
the first communication terminal is configured to specify one of the second communication terminals using a terminal number among the terminal numbers.

6. A signal conversion method, comprising:
converting, by a converter, signals transmitted in compliance with a first protocol to signals transmitted in compliance with a second protocol different from the first protocol, the first protocol providing for communicating without specifying another party in a communication including mutually transmitting or receiving signals that do not contain information specifying a device of the another party in communication, and converting signals transmitted in compliance with the second protocol to signals transmitted in compliance with the first protocol;
specifying, by a specifier, a second communication terminal among multiple second communication terminals transmitting or receiving signals in compliance with the first protocol to communicate with a first communication terminal via the converter;
switching, by a switcher, a first transmission channel on which signals are transmitted between any of the multiple second communication terminals and the converter to a second transmission channel connecting the second communication terminal specified in the specifying and the converter, and
sending, by the switcher, signals containing information for identifying the second communication terminal having sent signals in compliance with the first protocol to the specifier in compliance with the second protocol, the signals containing the information for identifying the second communication terminal being sent via a fourth transmission channel, a third transmission channel connecting the switcher and the converter and the fourth transmission channel connecting the switcher and the specifier.

7. The signal conversion system according to claim 1, wherein
   the switcher is configured to send, via the fourth transmission channel, without passing through the third transmission channel, the signals containing the information for identifying the second communication terminal having sent the signals in compliance with the first protocol, to the specifier in compliance with the second protocol, and
   the third transmission channel is included in the first transmission channel and the second transmission channel.

* * * * *